Oct. 23, 1923. 1,471,915

V. W. PAGÉ

DIFFERENTIAL

Filed Dec. 24, 1921

WITNESSES

INVENTOR
VICTOR W. PAGÉ
BY
ATTORNEYS

Patented Oct. 23, 1923.

1,471,915

UNITED STATES PATENT OFFICE.

VICTOR W. PAGÉ, OF NEW YORK, N. Y.

DIFFERENTIAL.

Application filed December 24, 1921. Serial No. 524,678.

*To all whom it may concern:*

Be it known that I, VICTOR W. PAGÉ, a citizen of the United States, and a resident of the city of New York, Kew Gardens, borough of Queens, in the county of Queens and State of New York, have invented a new and Improved Differential, of which the following is a full, clear, and exact description.

The present invention relates to new and useful improvements in motor vehicles and the like, and it pertains more particularly to a differential mechanism therefor.

It is one of the objects of the present invention to provide a new and improved form of differential mechanism in which all of the parts thereof may be bodily removed from the rear axle housing.

It is a further object of the invention to provide a differential mechanism which may be removed as a unit from the rear axle housing and without disturbing the adjustment thereof.

It is a further object of the invention to provide new and novel means for maintaining the adjustment of the bearings in a differential mechanism.

It is a further object of the invention to permit cutting bearing adjustment and retention threads, which are of necessity of small cross section to secure the necessary degree of fine adjustment and which would be weak if cut in soft metal, in solid hard metal rings which are provided with a substantial and strong external, integral collar fitting a corresponding annulus in the bearing carrier forming part of the differential housing. The retaining collar may be of any desired cross section and strength.

It is a further object of the invention to provide solid threaded rings of strong, hard metal for both externally and internally threaded adjustment members instead of depending on threads cut in the split, or two piece soft metal bearing carrier which is made of the same soft and relatively weak metal that the housing is composed of. Then, again, a better seat is provided for the hardened steel outer race rings of the ball bearings than would be obtained if they rested directly in soft metal.

With the above and other objects in view, reference is had to the accompanying drawings in which—

Figure 1:
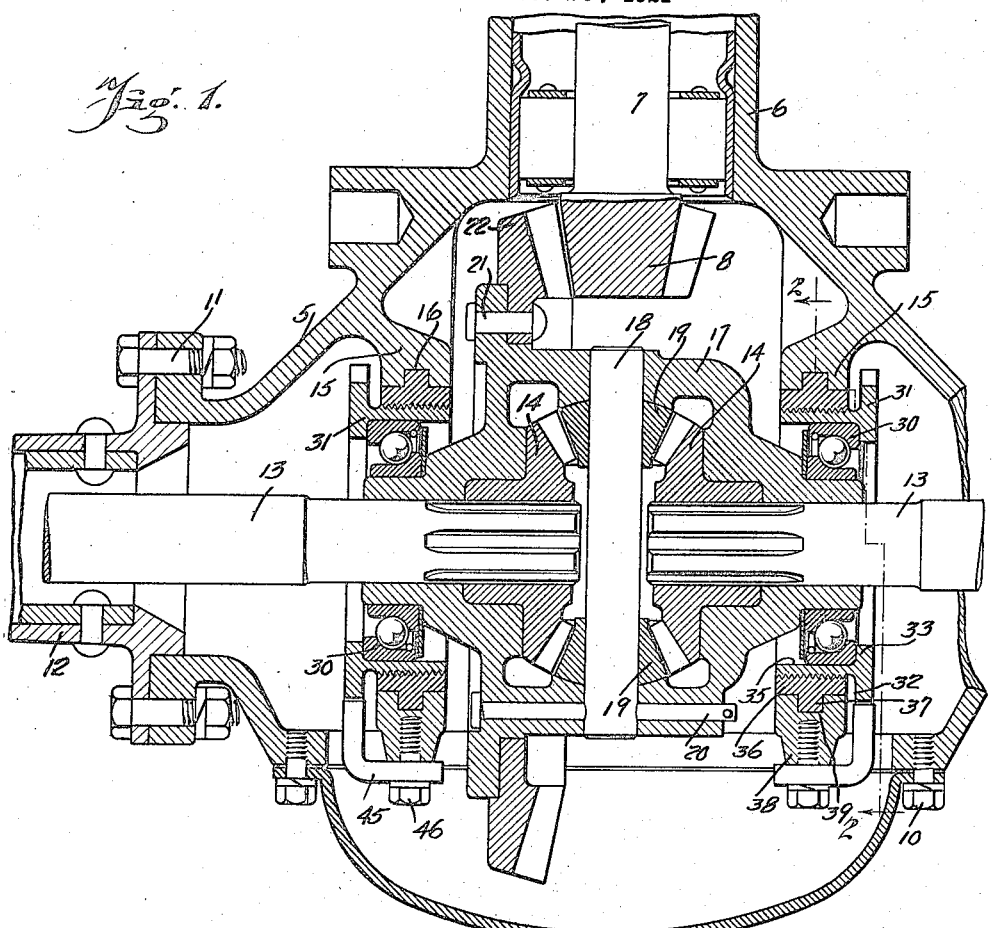
Figure 1 is a horizontal sectional view of a differential mechanism constructed in accordance with the present invention.
Figure 2:
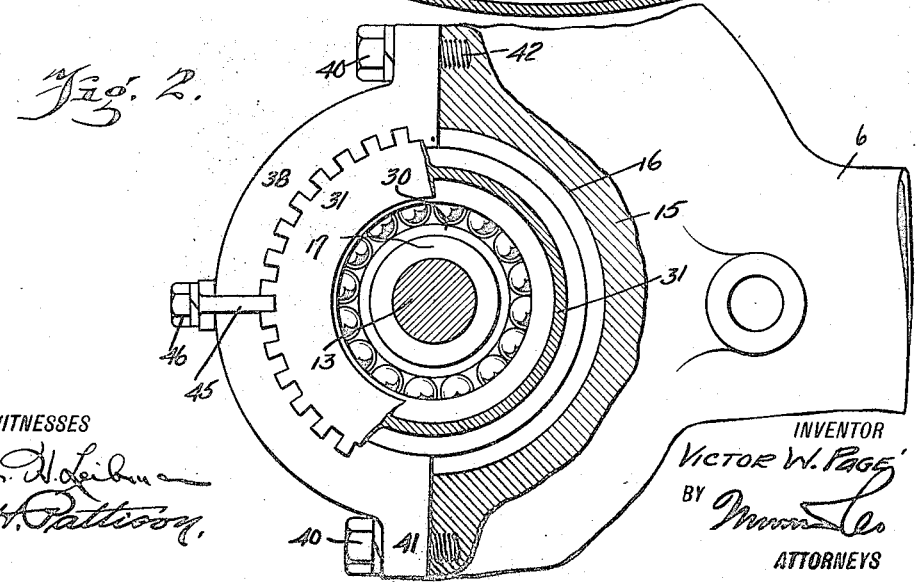
Fig. 2 is a vertical sectional view taken on the line 2—2 of Fig. 1.

Refering more particularly to the drawings, the reference character 5 designates the differential housing, and said housing 5 is provided with a forward extension 6 which forms a housing for the pinion shaft 7 upon the rear end of which is maintained the pinion 8. This differential housing 5 is provided with a rear plate 9 retained in position by means of cap screws or the like 10, and said rear plate when removed permits access to the interior of the housing 5.

Secured to the housing 5 by means of bolts or the like 11 at opposite sides thereof, are housings 12, and mounted in each of said housing 12 is an axle 13, upon the inner end of each of which is mounted a beveled gear 14.

The housing 5 is provided upon its forward face with a pair of spaced curved annuli 15, and each annulus is provided with a channel 16 extending throughout its length.

Mounted upon one of the axles 13 is a spider 17 and carried by said spider 17 is a pin or shaft 18, upon which is mounted a plurality of differential pinions 19, said differential pinions 19 meshing with the bevel gears 14 heretofore mentioned. This pin or shaft 18 is retained in the spider by means of a locking pin or the like 20. Secured to the spider by means of rivets or the like 21, is a ring or master gear 22, and this ring or master gear 22 is adapted to mesh with the driving pinion 8 carried by the pinion shaft 7.

The spider 17 is mounted in roller bearings 30, and each of these roller bearings is mounted within a ring or the like 31. Each ring 31 is provided with a notched flange 32, the purpose of which will be hereinafter described and each bearing is maintained in position by means of the inner flange 33 of its respective ring 31. Each of these rings 31 is provided with a screw-threaded flange 35, and said screw threaded flange is adapted to engage with a ring 36, which ring 36 is provided with a annular rib 37 adapted to be received within the heretofore-mentioned groove 16 of its respective annulus 15.

The reference character 38 designates a semi-circular cap, and said semi-circular cap is grooved as at 39 to receive the rib 37 of the ring 36. The cap 38 is maintained in place by means of cap screws or the like 40, which pass through flanges 41 formed thereon, and engage in recesses 42 in their respective annuli 15.

By this construction it is apparent that when it is desired to adjust the bearings 30, it is only necessary to rotate the ring 31, and the races of the bearings will be moved toward each other by the inner flange 33. After the adjustment has been made, the same is maintained by means of a right-angular member 45 secured to the caps 38 by a bolt or the like 46, and said right-angular member engages in the notches of the notched ring 31 heretofore mentioned.

When it is desired to remove the differential mechanism, it is only necessary to remove the cap 9 and the cap bearings 38. After this has been done and the axles 13 have been moved out of its engagement with the spider and their respective bevel gears, the entire differential mechanism may be removed as a unit, and, furthermore, this can be done without disturbing the adjustment of the spider bearings since the ring 36 after the caps have been removed may be freely removed from the annuli 15.

From the foregoing it is apparent that the present invention provides a new and novel form of differential mechanism in which the entire differential may be removed as a unit and without disturbing the adjustment of the bearings of the spider thereof.

I claim:

In a driving axle structure, a main housing, a differential mechanism mounted in said housing, and means for supporting said differential mechanism in said housing, said means comprising spaced semi-circular web members formed on said housing on the interior thereof, said web members each having an annular groove, a semi-circular member adapted to co-act with each of said semi-circular web members, said semi-circular web members each having an annular groove forming a continuation of the groove in its respective semi-circular web member, a continuous ring member mounted in each semi-circular web member and secured therein by their respective semi-circular member, said continuous ring members each having an external annular rib adapted to be received in the continuous groove of its respective semi-circular web member and semi-circular member, a bearing mounted internally of each of said continuous ring members and spaced with respect thereto, and a ring member interposed between each of said bearings and its respective continuous ring member, said second mentioned ring members each having threaded engagement with its respective first mentioned continuous ring member to provide for adjustment of the bearings.

VICTOR W. PAGÉ.